United States Patent
Fritsch et al.

(10) Patent No.: US 7,051,507 B2
(45) Date of Patent: May 30, 2006

(54) HYBRID CABLED CORD AND A METHOD TO MAKE IT

(75) Inventors: Jean-Francois Fritsch, Longwy (FR); Paul Rugraff, Charmes (FR); Jeffrey Allen Funderburk, Midlothian, VA (US)

(73) Assignee: Performance Fibers, Inc., Colonial Heights, VA (US)

( * ) Notice: Subject to any disclaimer, the term of this patent is extended or adjusted under 35 U.S.C. 154(b) by 188 days.

(21) Appl. No.: 10/396,867

(22) Filed: Mar. 25, 2003

(65) Prior Publication Data

US 2003/0159768 A1    Aug. 28, 2003

Related U.S. Application Data

(63) Continuation of application No. 09/653,571, filed on Aug. 31, 2000, now Pat. No. 6,601,378.

(60) Provisional application No. 60/153,002, filed on Sep. 8, 1999.

(51) Int. Cl.
*D01H 1/10* (2006.01)

(52) U.S. Cl. ........................ 57/314; 57/58.52

(58) Field of Classification Search .......... 57/236–238, 57/241, 244, 250, 314, 58.52; 152/451, 439, 152/526–529, 539
See application file for complete search history.

(56) References Cited

U.S. PATENT DOCUMENTS

| | | | |
|---|---|---|---|
| 3,419,059 A | 12/1968 | Bridge | 152/359 |
| 3,929,180 A | 12/1975 | Kawase et al. | 152/359 |
| 4,060,516 A | 11/1977 | Kuratsuji et al. | 260/75 |
| 4,063,408 A * | 12/1977 | Inohara et al. | 57/58.54 |
| 4,155,394 A * | 5/1979 | Shepherd et al. | 152/527 |
| 4,720,943 A | 1/1988 | Arrant | 57/210 |
| 4,877,073 A | 10/1989 | Thise et al. | 152/451 |
| 5,397,527 A | 3/1995 | Rim et al. | 264/210 |
| 5,419,383 A | 5/1995 | Iwamura | 152/209 R |

(Continued)

FOREIGN PATENT DOCUMENTS

EP    0 360 588 A2    9/1989

(Continued)

OTHER PUBLICATIONS

"Hybrid Tire Cords Containing Kevlar Aramid" by E.R. Barron, Kautschuk+Gummi Kunstostoffe 40, Jahrgang, Nr. Feb. 1987, pp. 130-135.

(Continued)

*Primary Examiner*—Shaun R. Hurley
(74) *Attorney, Agent, or Firm*—Morgan Lewis & Bockius LLP (57) ABSTRACT

The present invention is directed to a hybrid cabled cord comprising: at least two yarns having different properties and an unbalanced configuration wherein the hybrid cabled cord has improved tensile strength retention. In a preferred embodiment one of the two yarns comprises polyethylene terephthalate and the second of at least two yarns comprises polyethylene naphthalate and the coring level is between about 3% to about 15%. The present invention is also directed to a process for making a hybrid cabled cord comprising the steps of supplying at least two yarns having different properties to a direct cabler, and cabling the at least two yarns using the direct cabler to achieve a hybrid cabled cord having a coring level which is not zero. The present hybrid cabled cord may be used in tire cord for rubber reinforcement in passenger car tires, van tires, light truck tires, or motorcycle tires.

8 Claims, 3 Drawing Sheets

U.S. PATENT DOCUMENTS

| | | | |
|---|---|---|---|
| 5,558,144 A | | 9/1996 | Nakayasu et al. ........... 152/527 |
| 5,743,975 A | * | 4/1998 | Sinopoli et al. ............ 152/527 |
| 5,783,278 A | * | 7/1998 | Nishimura et al. .......... 428/102 |
| 5,845,476 A | * | 12/1998 | Kolmes ........................ 57/229 |

FOREIGN PATENT DOCUMENTS

| | | |
|---|---|---|
| EP | 0 335 588 B1 | 11/1992 |
| EP | 0 661 179 A1 | 12/1994 |
| EP | 0 751 971 A2 | 6/1996 |
| JP | KOKAI 241026 | 10/1991 |

OTHER PUBLICATIONS

"PEN Polyester: Potential for Fibers Derived from Napthalene Dicarboxylate (NDC)*" by Joanna K. Money, Journal of Coated Fabrics, vol. 25, Jul., 1995, pp. 24-38.

ICBT Product Brochure for CP 510/560 Direct Cabling Machine, pp. 2-7.

* cited by examiner

HYBRID CABLED CORD AND A METHOD TO MAKE IT

This application is a continuation of U.S. Ser. No. 09/653,571, filed Aug. 31, 2000, now U.S. Pat. No. 6,601,378.

RELATED APPLICATIONS

This application claims the priority date of now abandoned provisional application No. 60/153,002, filed Sep. 8, 1999.

BACKGROUND OF THE INVENTION

1. Field of the Invention

This invention relates to a composite of a plurality of yarns having different properties cabled together to form a hybrid cabled cord, and a method to make such a composite. This invention particularly relates to a hybrid cabled cord of polymeric materials having excellent properties at a reduced capital cost and is useful as a tire cord.

2. Brief Description of Related Art

Polyester tire cord has become increasingly common in recent years. Polyester, specifically, polyethylene terephthalate (PET), has many advantages over cords made of rayon or polyamide. Rayon has good dimensional stability but has low strength, poor durability and is hygroscopic. Polyamide has higher strength and durability compared to rayon but has poor dimensional stability. PET tire cord possesses high strength, good durability, better modulus and low creep. Another polyester, polyethylene naphthalate (PEN), provides even better mechanical properties, including modulus, breaking strength and elongation, for use in tires than PET. The use of conventional PEN as reinforcement in the carcass of tires using PEN has been taught, for instance, in U.S. Pat. No. 3,929,180 and U.S. Pat. No. 4,060,516. A PEN yarn having enhanced modulus and dimensional stability (defined as the sum of the elongation at 45 Newton and shrinkage) for use in tires is taught in U.S. Pat. No. 5,397,527. However PEN yarn, both conventional and the improved variety, is notably more expensive than PET, which limits its use in commercial practice to specialty tires such as those needed for high speed performance driving. An ideal tire cord for conventional tires therefore would provide the better mechanical properties of PEN but at the cost of a PET cord. Accordingly, the Inventors have undertaken the search for a solution to making such a tire cord.

It is known to combine yarns having different properties in order to generate a hybrid yarn having improved properties with respect to one or both of the constituent yarns. Examples of hybrid yarns are taught in: U.S. Pat. No. 3,419,059; U.S. Pat. No. 4,155,394; U.S. Pat. No. 5,419,383; U.S. Pat. No. 5,558,144; EP 0335588; and in "Hybrid Tire Cords Containing Kevlar Aramid" by E. R. Barron, Kautschuk+Gummi Kunstoffe 40, Jahrgang Nr. 2/87, pp. 130–135. Such hybrid yarns typically have an unbalanced construction in that the constituent yarns have unequal twist levels, and, in some instances, there is also a twist level in the cabled cord which is different from the constituent twisted yarns. Typically, the yarn having a higher modulus has a higher twist level compared to the yarn having the lower modulus in order to achieve a cabled cord in which the constituent twisted yarns break simultaneously. Yarns made using this approach show some property improvements, however, yarns of this construction are manufactured using a ring-twister machine. The ring-twister machine is disadvantageous as it requires multiple steps to yield the final product; the constituent yarns must first be twisted separately and then combined in another step to be twisted into the cabled cord. Therefore manufacture cost of such hybrid cabled cords using a ring twister is high.

To reduce or eliminate the cost of using a ring twister in preparing tire cord, U.S. Pat. No. 4,720,943 teaches a cord comprised of a core formed by two to five tire yarns laid side-by-side and wrapped by a wrapper yarn. The wrapper serves merely to hold the core yarns together.

There is prior art suggesting the combination of polyethylene terephthalate and polyethylene naphthalate in cords. In "PEN Polyester: Potential for Fibers Derived from Naphthalene Dicarboxylate (NDC)" by Joanna K. Money in Journal of Coated Fabrics, Vol. 25, Jul. 1995 (pp. 24–38) the development of PET/PEN core/sheath fibers is mentioned. Japanese Patent Publication 241026, published Oct. 28, 1991, teaches a hybrid cord formed by twisting or braiding together a plural number of yarns in which the main component is an all aromatic polyester or polyamide yarn with a melting point above 300° C. and the other component is a yarn of thermoplastic fiber with a melting point of 110 to 270° C. The cord is heat set at a temperature such that the second component softens and deforms to set the cord structure and presumably adds little to the overall mechanical properties of the resultant yarn.

None of the prior art teaches or suggests a hybrid cabled cord comprised of PET and PEN having a coring factor which is not equal to zero and improved tensile strength retention, nor the manufacture of such a cord using a direct cabler.

SUMMARY OF THE INVENTION

The present invention is directed to a hybrid cabled cord comprising: at least two yarns having different properties, and an unbalanced configuration and wherein said hybrid cabled cord has improved tensile strength retention. In a preferred embodiment, at least one of the yarns comprises polyethylene naphthalate. In another preferred embodiment, the two yarns comprise polyethylene terephthalate and polyethylene naphthalate and the coring level is between about 3% to about 15%. The present invention is advantageous in providing a cord that is less expensive than a 100% PEN cord yet having comparable properties.

The present invention is also directed to a process for making a hybrid cabled cord comprising the steps of: supplying at least two yarns having different properties to a direct cabler, and cabling the at least two yarns using the direct cabler to achieve a hybrid cabled cord having a coring level which is not zero.

DETAILED DESCRIPTION OF THE PREFERRED EMBODIMENTS

The phrase "cabled cord" as used here means at least two yarns twisted together.

The phrase "hybrid cabled cord" as used herein means at least two yarns having different properties and that are twisted together. Non-limiting examples of different yarn properties include elongation at specific loads, tensile strength and adhesion. Different properties may also be achieved by using yarns of the same polymer at different deniers.

The phrase "yarn" as used herein refers to a plurality of continuous fibers. A yarn may be a single polymer or copolymer, or may be a mixture of a plurality of polymer types formed, for instance, by winding the fibers of two or more polymer types together to form a single yarn end.

The phrase "flat yarn" as used herein refers to yarn which is not subjected to a twisting process using a twisting machine. Flat yarn is preferably drawn.

The phrase "twist number" as used herein refers to the number of turns required to separate a cabled cord of a given length into its two constituent yarns. This number is equal to the number of turns subsequently needed to return the so-separated yarns to the state as feeder yarns ("as-fed state").

The phrase "unbalanced configuration" as used herein means that the at least two yarns have different lengths and therefore have a coring level which is not equal to zero The phrase "balanced configuration" as used herein refers to a yarn having a coring level equal to zero. The difference in lengths is quantitated by determining the coring level. The coring level is measured by taking a sample of one meter of cabled cord and untwisting the cable in order to separate the two yarns which compose it. The so-separated yarns are then untwisted by the same number of turns as it took to separate the cable, and in the opposite direction, to yield the two yarns in their as-fed state. The length of each constituent yarn is then measured on the yarn in its as-fed state, and the coring level calculated using the following equation:

$$\text{Coring}=(A-B)/(B) \quad (1)$$

wherein A is the length of the yarn having the higher modulus and B is the length of the yarn having the lower modulus. For instance, a hybrid cabled cord has been made using a PET yarn having 100 turns per meter in the Z direction and a PEN yarn which is flat. The cord has been cabled to have 400 turns per meter in the S direction and a positive coring level. One takes a one meter length of hybrid cabled cord and uncables it by twisting 400 turns in the Z direction. The result is two separate yarns (which have a length greater than one meter) each of these yarns has 400 turns in the S directions. To return the two yarns to their as-fed state, each yarn must be untwisted 400 turns in the Z direction. This yields the yarns in their as-fed state, a length (B) of PET yarn having 100 turns per meter in the Z direction and length (A) of PEN yarn which is flat. If the hybrid cabled cord was made with a coring level which is not zero, then the two lengths of these two as-fed-state yarns will not be equal.

Figure 1:
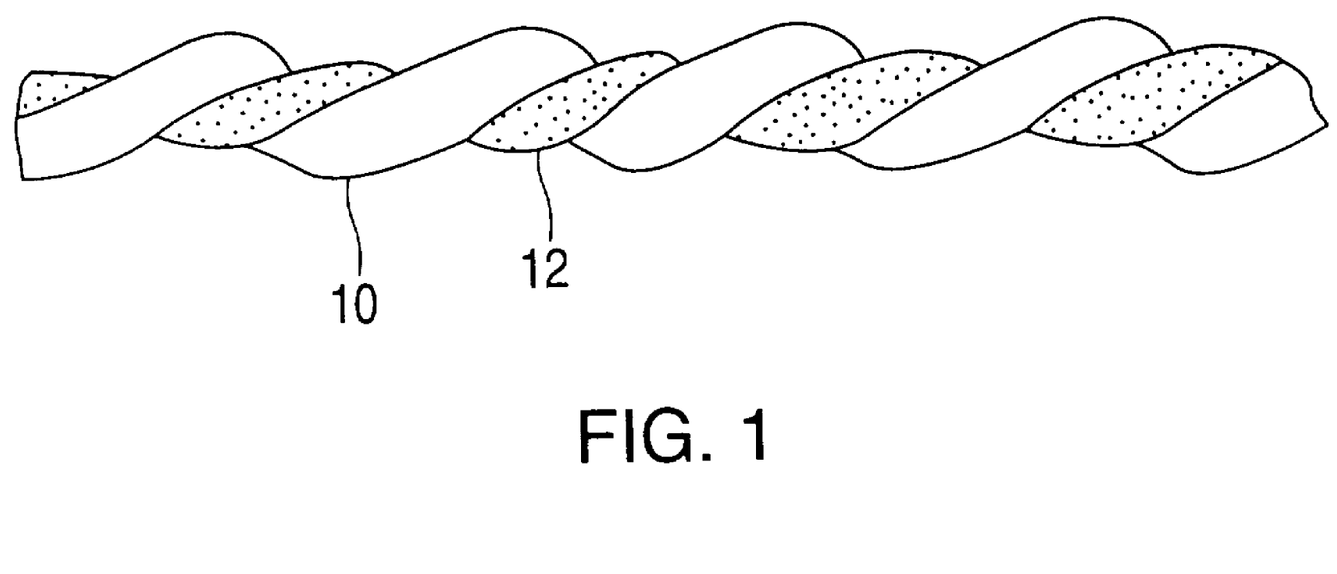
FIG. 1 is a schematic of the inventive hybrid cabled cord illustrating a coring level not equal to zero.

Shown in FIG. 1 is a schematic representation of an hybrid yarn wherein yarn 10 has a greater length in its as-fed state than yarn 12 thus the coring level is not equal to zero; if yarn 10 has the higher modulus, then the coring level is positive. A balanced configuration has a coring level of zero, that is, there is no difference in length in the two yarns. In the preferred embodiment of a hybrid cabled cord of PEN and PET, a positive coring level corresponds to a greater length of PEN. A negative coring level corresponds to a greater length of PET.

The product of a ring twister has a different architecture with respect to the constituent yarns compared to that found in the product of the direct cabler machine. Furthermore, ring twisters are not readily controlled and adjusted with respect to achieving and fine tuning coring level, in contrast to the direct cabler.

The cabled cord with unbalanced configuration is preferably obtained using a direct cabling machine. This machine is designed and intended to obtain balanced cord constructions by means of rolls and brakes that control the yarn tension of the two yarn ends and therefore yields a balanced construction having a balanced configuration. Direct cablers operate at considerably higher speeds (30–50% greater) than conventional ring twisters which is advantageous. Furthermore, direct cablers complete the production of cabled cord in one step whereas ring twisters require two steps: the yarns are first twisted individually (for example in the Z direction), and then the twisted yarns are twisted together (for example in the S direction) to form cabled cord. Advantageously, the direct cabler is fed with two yarns, and directly cables them to form cabled cord. In the as-fed state, the two yarns used may be twisted or one yarn may be twisted while the other yarn is flat or both yarns are flat, which is preferable. The product of a direct cabler has a balanced cord construction. If one untwists a given length of a direct cabler product, the two constituent yarns will become individually twisted and will have a twist number which is equal to, and opposite in hand to, the twist number in the parent cabled cord at the given length of cord. This will occur regardless of the coring level in the cabled cord.

In a typical direct cabler machine manufactured by ICBT, Valence, France, there are multiple cabling positions, arranged on two sides of the machine. Each position has two sources of yarn ends, a creel and a bucket, each of which has tension controls associated with it. The creel tension control is controlled pneumatically by a single control for the entire set of positions on a side of the direct cabler. Thus, every cabling position on that side will have the same creel tension. Every cabling position on the other side will also have the same creel tension which may be the same or different from the positions on the other side of the machine. In contrast, the tension on each bucket may be controlled independently at each position regardless of side, and is controlled, for instance, by magnetic brakes. There is an additional tension control mechanism immediately adjacent to where the two feeder yarns are cabled together. This mechanism is called a "butterfly" pulley. There are different varieties of butterfly pulleys but each is designed and intended to control tension and reduce slippage to achieve a balanced construction in the cabled cord. One type of butterfly pulley comprises two connected pulleys having equal diameters, about which the two yarns are wound an equal number of times. As the cabled cord is drawn from the machine, the two pulley turn with the same rotation per minute. The entire design of the direct cabler machine is intended to achieve a balanced tension control in the cabled cord produced which effectively means that the two yarns are pulled off with the same rate and thus equal lengths are incorporated into the cabled cord.

In order for the present Inventors to use a direct cabler to achieve an unbalanced configuration, in which the cabled cord has a coring factor which does not equal zero, the present Inventors disregarded the intention of the machine and thus proceeded contrary to the wisdom in the industry. The Inventors have discovered that there are several approaches to achieving an unbalanced configuration, all of which generally modulate the tension on the individual plies in order to generate an unbalanced configuration. One may use the tension control on the bucket, which can be independently controlled, to change the tension of the bucket yarn so that it is no longer equal to the yarn from the creel. This may involve disconnecting some of the pulleys that compensate the difference of length of the two single yarns, or wrapping the two yarns around the butterfly pulley an unequal number of times. The yarn with more wraps has increased friction and thus reduced slippage so it is pulled less than the other yarn, and will have a lesser length in the resulting cabled cord. Once the coring level for a given pair of yarns is optimized and defined for a given end use, one may contemplate as another method permanent machine modifications in order to restrict coring to that optimized level.

Using the direct cabler it is possible to make a cabled cord from two flat feed yarns having approximately the same yarn diameter, and produce a cabled cord having a coring level which is not zero and which is a balanced construction. A balanced construction contributes to ease of handling and processability of the cord.

The hybrid product of a direct cabler having a coring level which is not equal to zero has a greater tensile strength retention than a hybrid product made using a ring twister. Tensile strength retention is defined as the strength of the cabled cord divided by the sum of the strengths of the constituent feeder yarns. The tensile strength retention of a hybrid product resulting from a direct cabler compared with a hybrid product from a ring twister is preferably about 2.5% greater and more preferably about 5%.

One approach to optimizing a hybrid cabled cord for a given end use is to first, ascertain the cable twist at which fatigue resistance is maximized. Then, using this cable twist, evaluate the properties of interest at a range of coring levels, for instance, −30% to 30%, in order to optimize the hybrid cabled cord. Note that the cord twist is set by setting the take up and spindle speeds of the machine while the coring is done by controlling the tension of one yarn end versus the other yarn end. These two features are independent of each other.

Polymeric yarns useful in the inventive method and product include any yarn suitable for industrial or textile use. Non-limiting examples include: polyester such as polyethylene terephthalate (PET) and polyethylene naphthalate (PEN); polyamides such as aramid, nylon-6, nylon-6,6 and nylon-4,6; rayon viscose; polyolefins such as polyolefin ketone (POK); polyvinyl alcohol (PVA); polyacrylonitrile (PAN); polyparaphenylene terephthialamide (PPTA); polymethaphenylene isophthalamide (PMIA); polyparaphenylene terephthialamide copolymer (PPTAC); copolyimide (PIC); polyamide imide (PAI); polyether imide (PEI); polybenzoxazole (PBZO); polybenzothiazole (PBZT); polyethylene fibers such as Spectra®; carbon fibers and fiberglass. Exemplary aramid fibers include poly(-phenyleniediamine terephthalamide) fibers produced commercially by DuPont Corporation of Wilmington, Del., USA under the trade names of Kevlar® 29, Kevlar® 49 and Kevlar® 129. Exemplary PVA fibers as those, for example, by the process disclosed in commonly assigned U.S. Pat. No. 4,559,267 to Kwon et al. Detail on filaments of polybenzoxazoles (PBZO) and polybenzothiazoles (PBZT), may be found in "The Handbook of Fiber Science and Technology: Volume II, High Technology Fibers," Part D, edited by Menachem Lewin, hereby incorporated by reference. Generally, any combination of yarns having different properties is possible with the instant invention. Preferred combinations are two yarns having different moduli with a non-zero coring level no greater than about 25% and no less than about −25%. Notably, a capital advantage is achieved if one yarn is more expensive than the other and the resultant hybrid with a coring not equal to zero yields properties comparable to a cord made entirely of the expensive yarn but at a reduced cost.

Denier and denier per filament (dpf) of any given yarn are chosen as appropriate for the intended end use. For tire reinforcement applications, yarn deniers of about 500 to about 5000, and a dpf range of about 1 to about 15 are useful.

Preferably, the present hybrid cabled cord comprises polyester plied yarns such as poly(naphthalene terephthalate) ("PET") yarn and poly (ethylene naphthalate) ("PEN") yarn. Suitable PET yarns are commercially available as 1×90, 1×30 yarn, 1×40 yarn and 1×50 yarn and suitable PEN yarn is commercially available as PENTEX™ yarn from Honeywell International, Inc., Colonial Heights, Va., USA ("Honeywell"), either top-coated with an adhesive active finish, or not. Preferably, each yarn is drawn and has an ultimate elongation of less than about 30 percent.

The present hybrid cabled cord may be used in tire cord for rubber reinforcement in passenger car tires, van tires, light truck tires or motorcycle tires, for instance in the carcass and/or a beltand/or a cap ply. A tire belt reinforced with PEN cord is taught in co-pending application Ser. No. 09/288,589, filed Apr. 8, 1999; a hybrid cabled cord as taught in the present disclosure may be useful in the co-pending application. The present hybrid cabled cord may also be used in conveyor belts, transmission belts, V-belts, hosing, and narrow fabrics.

TESTING METHODS

Tensile measurements were measured using an Instron tester at a strain rate of 120% min$^{-1}$ at room temperature (25° C.). Dimensional stability and shrinkage were determined under a tension of 0.05 grams per decitex (g/dtex) or 2 minutes at 177° C. in a closed Testrite oven in accordance with the ASTM method.

Breaking strength, elongation at break, load as specified elongation (LASE), elongation at specified load (EASL), and linear density were determined according to ASTM D885M-94: Standard Test Methods for Tire Cords, Tire Cord Fabrics, and Industrial Filament Yarns Made From Manufactured Organic-Base Fibers. Samples are conditioned at 65% relative humidity at 70° F. (21° C.). Although ASTM 885 indicates that twist may be inserted into the yarn because of clamp slippage, we did not insert twist.

Energy to break is the total of the energy required to strain a cord up to its breaking point. This property is related to the total energy required to break a tire carcass.

Breaking strength after fatigue is measured using the industry standard called the disc fatigue test (Uniroyal Goodrich Disc Fatigue test). Treated cord samples are submitted to conditions simulating tire curing and embedded in rubber blocks and are then subjected to cycles of tension and compression to simulate the alternative stretch and compression that a cord would undergo in the turn up area of a monopoly passenger tire. The fatigue resistance is calculated as the ratio of the remaining strength measured after the test and the tensile strength before the disc fatigue test.

EXAMPLES

Experiment 1

The cabled cords in Table 1 were all cabled using a CP560 direct cabling machine commercially available from ICBT. The PEN yarn used in Comp. Exs. A, B and Inv. Exs. 1 through 4 was a 1440 dtex (decitex; 1300 denier) flat yarn having 7.14 denier per filament and is commercially available as PENTEX® yarn from Honeywell. The PET yarn used in Comp. Exs. B, C and Inv. Exs. 1 through 4 was also a 1440 dtex flat yarn having 3.3 denier per filament and is commercially available as DSP® 1×53 yarn from Honeywell. Each cabled cord was twisted at 410 turns per meter (tpm; ~10.4 turns per inch) and at a spindle speed of 6000 rotation per minute (rpm). The three comparative example cords in Table 1 have a coring level of zero. The four inventive cords have coring levels which are not equal to zero. The non-zero coring in the Inv. Exs. was achieved by adjusting the magnetic bucket pulley.

The data in Table 1 was measured on greige cord. In Table 1, N is the abbreviation for Newton.

Figure 3:
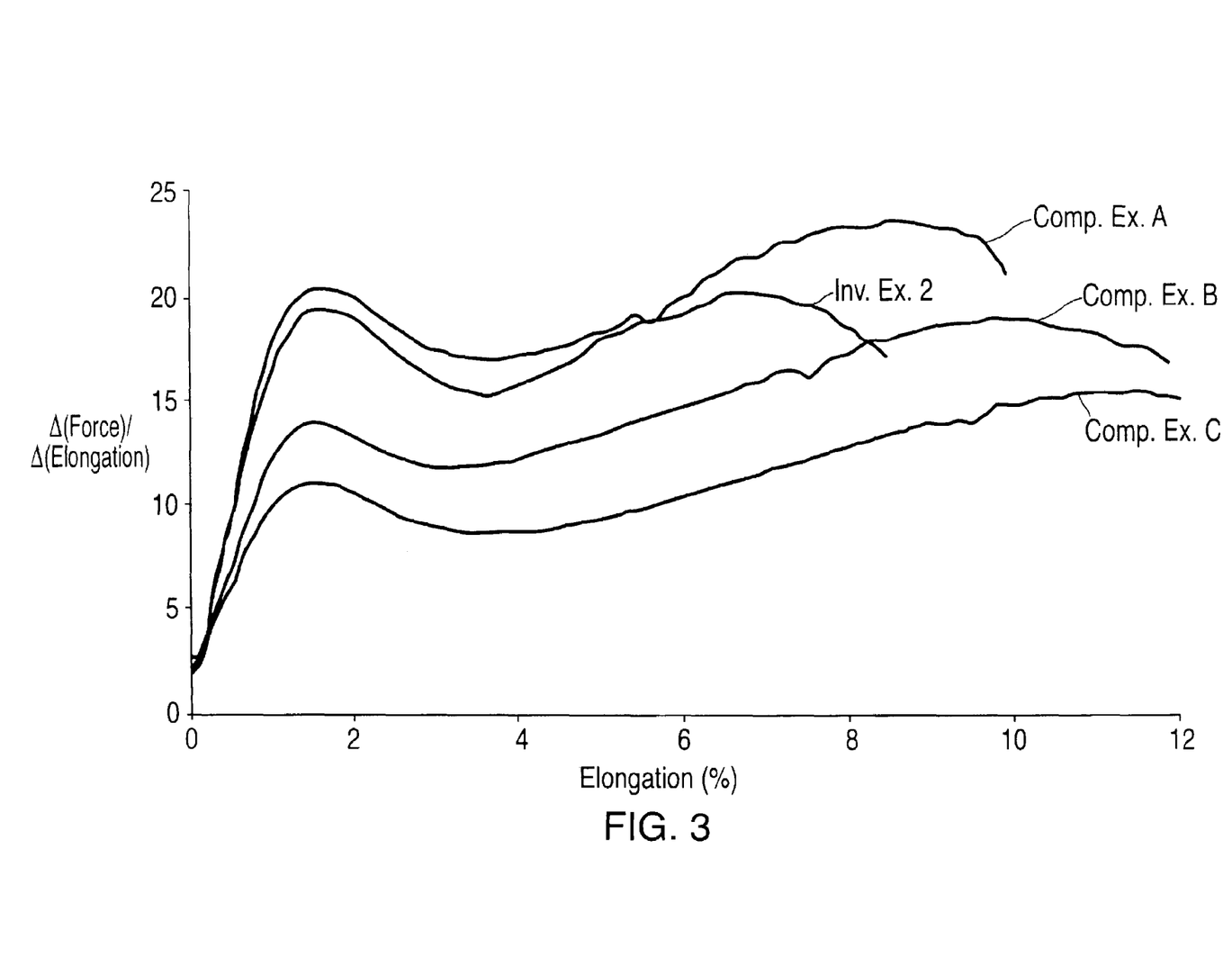
FIG. 3 is a graph of the first derivative of the stress-strain curve as a function of strain for three comparative examples and an inventive example.

FIG. 3 is a graph of the first derivative of the stress-strain curve as a function of strain for three comparative examples and an inventive example. This graph demonstrates that a hybrid cord of coring level about −12% (Inv. Ex 2) can achieve a secant modulus comparable to the all-PEN comparative (Comp. Ex. A) while the hybrid having a coring level of zero (Comp. Ex. B) is closer to that of an all-PET cord (Comp. Ex. C).

Experiment 2

To test the effectiveness of the inventive hybrid cabled cords fabric constructions typical of that used to reinforce

TABLE 1

| Inv. Ex. | Comp. Ex. | Cord components | Coring level | Breaking Strength (N) | Elongation at Break (%) | LASE at 1.6% (N) | LASE at 3% (N) | Elongation (%) at 45 N |
|---|---|---|---|---|---|---|---|---|
|  | A | PEN/PEN | 0 | 199.2 | 10.4 | 21.4 | 48.7 | 2.7 |
| 1 |  | PEN/PET | −15% | 154 | n.d. | n.d. | n.d. | n.d. |
| 2 |  | PEN/PET | −12.2% | 154.3 | 9.3 | 20.8 | 45.4 | 3.1 |
| 3 |  | PEN/PET | −9.2% | 160.8 | 10.2 | 17.5 | 40.5 | 3.4 |
| 4 |  | PEN/PET | −6.3% | 164.7 | 11.1 | 16.5 | 32.8 | 4.0 |
| 5 |  | PEN/PET | −3.2% | 170.1 | 11.4 | 15.7 | 33.9 | 3.9 |
|  | B | PEN/PET | 0 | 180.5 | 12.4 | 15 | 32.7 | 4.1 |
| 6 |  | PEN/PET | 0.9% | 184 | 12.8 | 14.6 | 33.7 | 4.1 |
| 7 |  | PEN/PET | 4.5% | 184.5 | 13.8 | 13.8 | 30.8 | 4.3 |
| 8 |  | PEN/PET | 7.7% | 183.5 | 15.4 | 13.2 | 28.6 | 4.6 |
| 9 |  | PEN/PET | 13.9% | 170.4 | 16.3 | 12.8 | 27.6 | 4.7 |
| 10 |  | PEN/PET | 15% | 170 | n.d. | n.d. | n.d. | n.d. |
|  | C | PET/PET | 0 | 177.7 | 18.9 | 12.5 | 26.2 | 5.2 |

Notably the balanced configuration of the PET/PEN hybrid (Comp. Ex. B) had a breaking strength and LASE at 1.6% closer to that of the all-PET balanced configuration (Comp. Ex. C), and had elongation at break value closer to that of the all-PEN configuration (Comp. Ex. A). The inventive hybrid cords, having unbalanced configuration, depending on the degree and sign of the coring, possessed different properties. Higher modulus hybrid cabled cord can be achieved by the use of negative coring (Inv. Exs. 2–5). For a combination of a high breaking strength and a high elongation at break, a positive coring value is satisfactory (Inv. Exs. 7 and 8). Thus, physical properties (breaking strength, elongation at break, energy to break and modulus) can be optimized by an appropriate coring level of PEN with PET.

Figure 2:
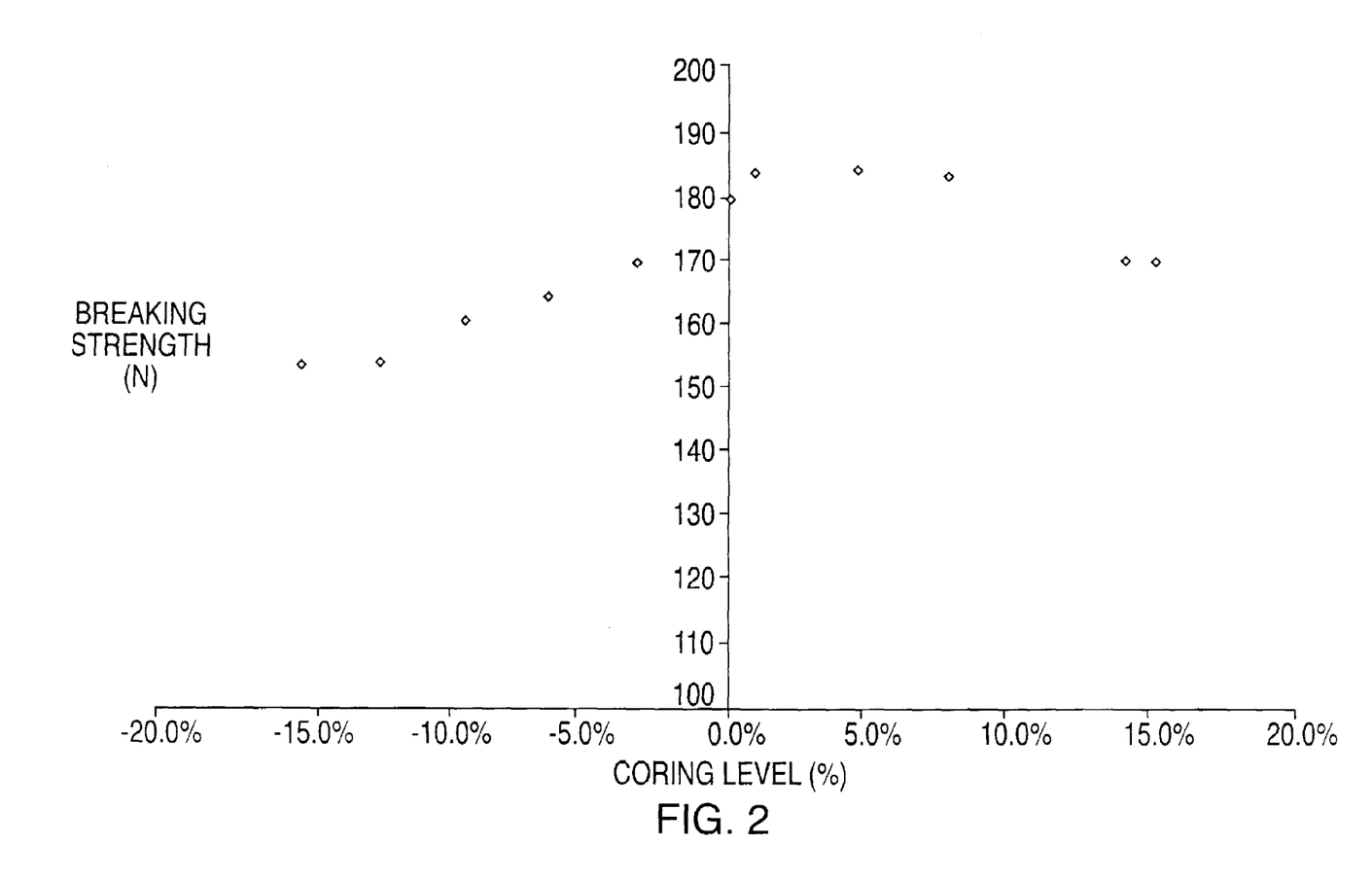
FIG. 2 is a graph of breaking strength as a function of coring level for a series of inventive hybrid cabled cords.

FIG. 2 is a graph of the breaking strength as a function of coring level of the inventive hybrid cabled cords (Inv. Exs. 1–10). The data for the balanced hybrid configuration (Comp. Ex. B) is also shown for reference. This graph emphasizes the observation that the breaking strength can be maximized at a coring level of about 5%. Breaking strength of the drawn flat PEN yarn of 1440 dtex was about 125 N and of the drawn flat PET yarn of 1440 dtex was about 98.2 N.

tires were constructed using a variety of cabled cords. The fabrics had various values for cord ends per decimeter (epdm) as listed in Table 2 and were treated to a dip/dry/stretch/dip/relax process as follows:

First Dip: Blocked diisocyanate type

First oven: Drying 45 seconds at 140° C. under 24N/cord tension

Second oven: stretching for 45 seconds at 238° C. under 24N

Second dip: Resorcinol Formaldehyde Latex type

Third oven: drying for 45 seconds at 140° C. under 24N

Last oven: relaxation for 45 seconds at 238° C. under 12N

Speed in oven: 26.7 M/minute

Comp. Ex. D cord was an all-rayon cord in a 1840 dtex×2, 470 tpm construction and had a zero coring level. The remaining cabled cords were those made in Experiment 1. Various properties of these fabrics were measured and the data are summarized in Table 2. "EPDM" stands for ends per decimeter; this represents the number of cord ends in a 10 cm piece of fabric; "g/m$^2$" stands for grams per square meter; "N/dm" stands for Newtons per decimeter.

TABLE 2

| Fabric label | Cord Ex | Cord constituent yarns | Fabric density (epdm) | Fabric weight (g/m$^2$) | Fabric strength (N/dm) | Tire deformation (%) | Energy to break (N) | Breaking strength after fatigue (N/dm) |
|---|---|---|---|---|---|---|---|---|
| D-1 | Comp. Ex. D | Rayon | 115 | 487 | 17323 | 4.32 | 377 | 15937.1 |

TABLE 2-continued

| Fabric label | Cord Ex | Cord constituent yarns | Fabric density (epdm) | Fabric weight (g/m²) | Fabric strength (N/dm) | Tire deformation (%) | Energy to break (N) | Breaking strength after fatigue (N/dm) |
|---|---|---|---|---|---|---|---|---|
| A-1 | Comp. Ex. A | PEN | 98 | 320 | 19090 | 1.84 | 244 | 11263.3 |
| B-1 | Comp. Ex. B | PEN/PET | 112 | 366 | 19040 | 2.59 | 270 | 10281.6 |
| 7-1 | Inv. Ex. 7 | PEN/PET | 102 | 333 | 19054 | 3.14 | 304 | 12765.9 |
| 10-1 | Inv. Ex. 10 | PEN/PET | 107 | 349 | 19078 | 3.55 | 368 | 9920.6 |
| 7-2 | Inv. Ex. 7 | PEN/PET | 125 | 408 | 23350 | 2.56 | 373 | 15644.5 |
| C-1 | Comp. Ex. C | PET | 106 | 346 | 19091 | 4.15 | 409 | 15272.5 |

The data in Table 2 demonstrate that fabrics constructed with hybrid cabled cords having positive coring (fabrics 7-1, 10-1 and 7-2) offer a significant improvement in energy to break, and therefore tire impact resistance, compared to the fabric constructed with the all-PEN cord (fabric A-1), the fabric constructed with the balanced configuration hybrid (fabric B-1), and may be made comparable or nearly comparable to that of fabric constructed with rayon (fabric D-1). At equal tire strength, the poor fatigue resistance of the fabric constructed with all PEN cord (fabric A-1) can be markedly improved using the inventive hybrid cable having an about 5% coring level at both 102 epdm and 125 epdm (fabrics 7-1 and 7-2), achieving levels comparable to both the all-rayon fabric (D-1) and the all-PET fabric (C-1). All of the fabrics using the inventive hybrid cabled cord have fabric modulus which is better than with the all-rayon or the all-PET fabrics. The fabrics constructed with the inventive hybrid cabled cords may have fabric strengths comparable to or better than that of the all-PEN or the all-PET, as well as better than the all-rayon fabric.

In summary, desirable properties in fiber-reinforced fabric for use in reinforcing tires are: a low fabric weight, high fabric strength, high energy to break, high breaking strength after fatigue and a low tire deformation (reflecting a high fabric stiffness or modulus). Thus, the novel hybrid cabled cords having an unbalanced configuration or a coring level which is not equal to zero offer an ideal combination of properties for use in tire reinforcement.

Experiment 3

To examine the effect of dipping of the hybrid cabled cord on the cord breaking strength and the coring level, greige cord was used to prepare a fabric typical of what is used in the manufacturing of tires. The fabric was then dipped as described in Experiment 2. The coring level and breaking strength were then measured on both the greige cord and the treated cord. The data are reported in Table 3.

TABLE 3

|  |  |  | Greige cord | | Treated cord | |
|---|---|---|---|---|---|---|
| Inv. Ex. | Comp. Ex. | Cord constituent yarns | Coring level | Breaking strength (N) | Coring level | Breaking strength (N) |
|  | A | PEN/PEN | 0 | 199.2 | 0 | 192.5 |
| 11 |  | PEN/PET | −13.3% | 149.9 | −9.7% | 140.3 |
| 12 |  | PEN/PET | −5.8% | 163.15 | −4.5% | 162.0 |
|  | B | PEN/PET | 0 | 180.5 | 1.5% | 176.6 |

TABLE 3-continued

|  |  |  | Greige cord | | Treated cord | |
|---|---|---|---|---|---|---|
| Inv. Ex. | Comp. Ex. | Cord constituent yarns | Coring level | Breaking strength (N) | Coring level | Breaking strength (N) |
| 13 |  | PEN/PET | 3.3% | 182.0 | 3.8% | 182.6 |
| 14 |  | PEN/PET | 12.4% | 172.8 | 10.8% | 179.0 |
|  | C | PET/PET | 0 | 177.7 | 0 | 182.5 |

These data indicate that the dipping process commonly used in the manufacture of fiber-reinforced tires caused very little reduction in the inventive hybrid cabled cord breaking strength and was comparable to the change seen in the all-PEN or all-PET cabled cords. In the hybrid cabled cords the coring level was altered slightly as well. The hybrid (Inv. Ex 13) having an about 5% coring level had the maximum stability with respect to both the breaking strength and the coring level after dipping.

Comparative Examples

Hybrid cabled cords are made using a ring twister. There are two yarns in each construction. In one cord (Comp. Ex. E) the two yarns have the same denier but are given different yarn twist levels such that length of flat yarn required to produced a given length of twisted yarn is not equal. The properties of these two yarns are different. The two so-twisted yarns are cabled using a ring twister. The cable twist can be same as one of the yarn twists. The resultant cord is considered to have an unbalanced cord construction and will also have a coring level which is not zero. The non-zero coring level results from the difference in the two yarns contraction due to different twist levels inserted during the first twisting process.

A second cord (Comp. Ex. F) is made from two constituent yarns wherein the yarns have dramatically different deniers and thus different diameters. The yarns have different properties. The yarns are given the same yarn twist and are then cabled using a ring twister with a cable twist equal to and opposite in hand to the yarn twist. The resultant hybrid cabled cord is considered to have a balanced cord construction and will also have a coring level which is not zero. The non-zero coring level results from the large difference in diameters in the constituent yarns.

What is claimed is:

1. A process of manufacturing a hybrid cabled cord comprising the steps of:
   (a) supplying at least two yarns having different properties to a direct cabler, and,
   (b) cabling said at least two yarns using said direct cabler to achieve a hybrid cabled cord wherein said coring level is equal to or greater than about 3% up to and no greater than about 15%.

2. A process of manufacturing a hybrid cabled cord comprising the steps of:
   (a) supplying at least two yarn having different properties to a direct cabler, and,
   (b) cabling said at least two yarn using said direct cabler to achieve a hybrid cabled cord wherein said coring level is equal to or greater than about −15% up to and no greater than about −3%.

3. The process according to claim 1 wherein one of said at least two yarn is polyethylene naphthalate.

4. The process according to claim 1 wherein at least one other of said at least two yarns is polyethylene terephthalate.

5. The process according to claim 1 wherein one of said at least two yarns is aramid.

6. The process according to claim 2 wherein one of said at least two yarns is polyethylene naphthalate.

7. The process according to claim 2 wherein at least one other of said at least two yarns is polyethylene terephthalate.

8. The process according to claim 2 wherein one of said at least two yarns is aramid.

* * * * *